United States Patent
Murata et al.

(10) Patent No.: US 6,639,505 B2
(45) Date of Patent: Oct. 28, 2003

(54) TEMPERATURE SENSOR

(75) Inventors: Shigeru Murata, Toyota (JP); Atsushi Kurano, Kuwana (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/104,071

(22) Filed: Mar. 25, 2002

(65) Prior Publication Data

US 2002/0135455 A1 Sep. 26, 2002

(30) Foreign Application Priority Data

Mar. 23, 2001 (JP) ........................................ 2001-085722
Feb. 14, 2002 (JP) ........................................ 2002-036551

(51) Int. Cl.[7] ................................................ H01C 3/04
(52) U.S. Cl. ........................... 338/25; 338/28; 374/185; 374/208
(58) Field of Search ................... 338/25, 28; 374/185, 374/208

(56) References Cited

U.S. PATENT DOCUMENTS

| 2,543,177 | A | * | 2/1951 | Korsgren | |
|---|---|---|---|---|---|
| 5,481,240 | A | * | 1/1996 | Fukaya et al. | |
| 5,749,656 | A | | 5/1998 | Boehm et al. | |
| 6,130,598 | A | * | 10/2000 | Katsuki et al. | ................ 338/28 |
| 6,264,363 | B1 | * | 7/2001 | Takahashi et al. | .......... 374/185 |
| 2002/0131477 | A1 | * | 9/2002 | Kurano | |

FOREIGN PATENT DOCUMENTS

| DE | 4104674 | * | 8/1992 | ................. 374/185 |
|---|---|---|---|---|
| EP | 0783096 A | | 7/1997 | |
| GB | 2035553 | * | 6/1980 | ................. 374/185 |
| JP | 52-7535 | | 3/1977 | |

OTHER PUBLICATIONS

Patent Abstracts of Japan, vol. 009, No. 120 (P–358), May 24, 1985 & JP 60 004832 A (Murata Seisakusho:KK), Jan. 11, 1996.

* cited by examiner

*Primary Examiner*—Karl D. Easthom
(74) *Attorney, Agent, or Firm*—Nixon & Vanderhye, PC

(57) ABSTRACT

A temperature sensor which features improved response characteristics and in which a thermistor element is contained in a metal enclosure in a state where a pair of electrode wires for taking out signals are connected in an exposed manner at two opposing end surfaces thereof. The temperature sensor comprises a metal enclosure 2, a thermistor element 3 contained in the metal enclosure, and a pair of electrode wires 4 connected to the two opposing end surfaces of the thermistor element in a form being exposed over the thermistor element in the metal enclosure to take out thermistor signals, wherein a distance H between the thermistor element and the metal enclosure is not smaller than 0 but is not larger than 0.3 mm.

13 Claims, 12 Drawing Sheets

Fig.8

| | FREQUENCY BAND | | | |
|---|---|---|---|---|
| | ~500Hz | ~1000Hz | ~1500Hz | ~2000Hz |
| 10G | ○○ | ○○ | ○○ | ○○ |
| 20G | ○○ | ○○ | ○○ | ○○ |
| 30G | ○○ | ○○ | ○○ | ×× |
| 40G | ○○ | ○○ | ×× | ×× |
| 50G | ○○ | ○× | ×× | ×× |
| 60G | ○○ | ×× | ×× | ×× |

(ACCELERATION on vertical axis)

TWO OF EACH TESTED
○: NO PROBLEM
×: BROKEN

Fig.9

| | FREQUENCY BAND | | | |
|---|---|---|---|---|
| | ~500Hz | ~1000Hz | ~1500Hz | ~2000Hz |
| 10G | ○○ | ○○ | ○○ | ○○ |
| 20G | ○○ | ○○ | ○○ | ○○ |
| 30G | ○○ | ○○ | ○○ | ○○ |
| 40G | ○○ | ○○ | ○○ | ○○ |
| 50G | ○○ | ○○ | ○○ | ○○ |
| 60G | ○○ | ○○ | ○○ | ○○ |

(ACCELERATION on vertical axis)

TWO OF EACH TESTED
○: NO PROBLEM
×: BROKEN

Fig.10

| | FREQUENCY BAND | | | |
|---|---|---|---|---|
| | ~500Hz | ~1000Hz | ~1500Hz | ~2000Hz |
| ACCELERATION 10G | ○○ | ○○ | ○○ | ○○ |
| 20G | ○○ | ○○ | ○○ | ○○ |
| 30G | ○○ | ○○ | ○○ | ×× |
| 40G | ○○ | ○○ | ○× | ×× |
| 50G | ○○ | ○○ | ×× | ×× |
| 60G | ○○ | ○○ | ×× | ×× |

TWO OF EACH TESTED
○: NO PROBLEM
×: BROKEN

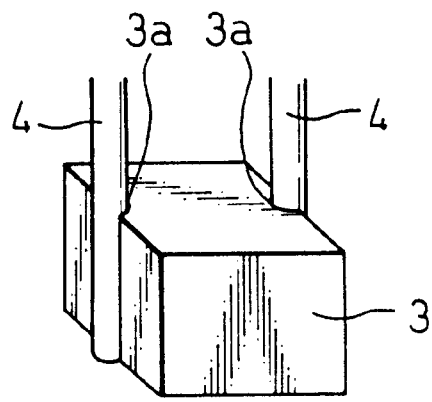
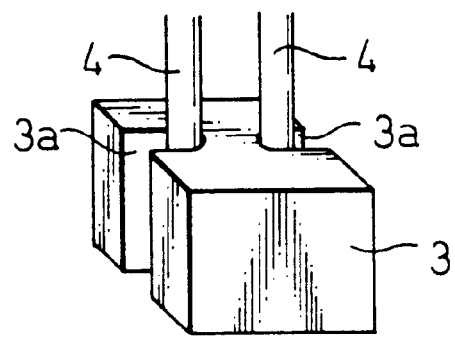
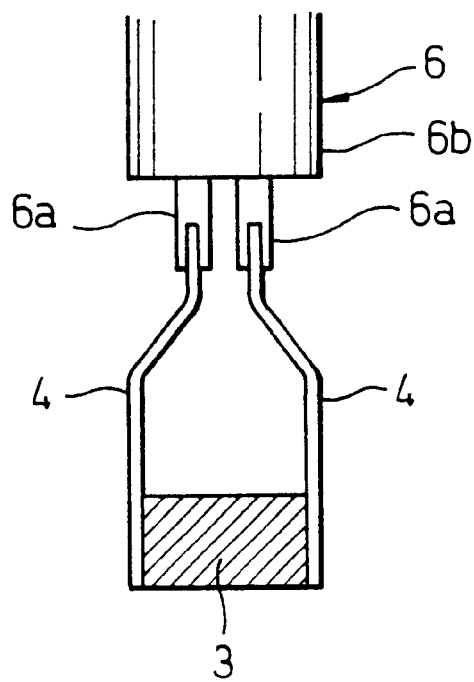

TEMPERATURE SENSOR

BACKGROUND OF THE INVENTION

1. Field of the Invention

The present invention relates to a temperature sensor in which a thermistor element is contained in a metal enclosure in a state where a pair of electrode wires for taking out signals are connected in an exposed manner at two opposing end surfaces thereof.

2. Description of the Related Art

There has heretofore been proposed a thermistor element in which a pair of electrode wires are connected to the two opposing end surfaces of the thermistor element in an exposed form to take out signals from the thermistor element, and the thermistor element is held by these electrode wires (hereinafter referred to as thermistor element of the type held by the electrode wires) as disclosed in Japanese Examined Patent Publication (Kokoku) No. 52-7535.

The thermistor element of the type held by the electrode wires is usually assembled by being inserted in a cylindrical metal enclosure, and is used as a temperature sensor. It has been desired to provide a temperature sensor which features further improved response characteristics for detecting the temperature (high-speed response characteristics).

SUMMARY OF THE INVENTION

In view of the above-mentioned problem, it is an object of the present invention to provide a temperature sensor obtained by containing, in a metal enclosure, a thermistor element of the type held by the electrode wires, which features improved response characteristics.

Concerning the response characteristics of the temperature sensor, the present inventors have regarded the time (response time) until a signal from the thermistor element represents 630° C. as a reference for judgement under a condition where the temperature sensor is placed in an atmosphere of 1000° C. and is heated up to 1000° C. The response time, so far, is 6 seconds at the shortest.

The present inventors have considered that the response time can be decreased to shorter than 6 seconds if the distance between the metal enclosure and the thermistor element is decreased to be as small as possible, and have made a study concerning the distance between the metal enclosure and the thermistor element. The invention according to a first aspect is accomplished based on the results of this study.

Namely, according to the first aspect of the present invention, there is provided a temperature sensor comprising:
- a metal enclosure 2;
- a thermistor element 3 contained in the metal enclosure; and
- a pair of electrode wires 4 connected to the two opposing end surfaces of the thermistor element in a form being exposed over the thermistor element in the metal enclosure to take out thermistor signals; wherein
- a distance H between the thermistor element and the metal enclosure is not smaller than 0 but is not larger than 0.3 mm.

Namely, there is provided a temperature sensor having a response time shorter than 6 seconds, which was past the quickest response time, making it possible to achieve further increased response characteristics.

According to a second aspect of the invention, the metal enclosure 2 is of a cylindrical shape, the thermistor element is contained in the metal enclosure on the side of one end thereof, and a portion of the metal enclosure where the thermistor element 3 is contained, is a small-diameter portion 2a which is so draw-formed as to possess a diameter smaller than that of other portions of the metal enclosure.

By draw-forming the thermistor element-containing portion of the cylindrical metal enclosure, it is allowed to favorably realize the distance between the thermistor element and the metal enclosure as contemplated in the first aspect of the invention.

According to a third aspect of the invention, a sheath pin 6 is contained in the metal enclosure 2 on the other side thereof, the sheath pin 6 having core wires 6a electrically connected to the pair of electrode wires 4 and having a diameter larger than that of the thermistor element 3, wherein a portion of the metal enclosure between the portion 2c containing the sheath pin and the small-diameter portion 2a is so draw-formed as to possess a diameter larger than that of the small-diameter portion but is smaller than that of the portion containing the sheath pin.

This makes it possible to reduce the heat capacity by decreasing the size and volume of the metal enclosure in addition to obtaining the effect of the second aspect of the invention, and is desirable for improving the response characteristics.

To improve the response characteristics of the sensor, further, it is desired to decrease the diameter of the metal enclosure to reduce the heat capacity accompanied by a decrease in the size of the thermistor element. In this case, the thermistor element is realized in a size as contemplated in the fourth and fifth aspect of the invention as compared to the outer diameter of the sheath pin.

That is, according to the fourth aspect of the invention, a ratio D1/D2 of the outer diameter D1 of the sheath pin 6 to the diameter D2 of a circumscribed circle C of the thermistor element 3 is from 2 to 10 in the temperature sensor of the third aspect of the invention.

According to the fifth aspect of the invention, the outer diameter D1 of the sheath pin 6 is from 1.6 mm to 3.2 mm, and the diameter D2 of the circumscribed circle C of the thermistor element 3 is from 0.35 mm to 0.8 mm in the temperature sensor of the third aspect of the invention.

According to a sixth aspect of the invention, there is provided a temperature sensor comprising:
- a metal enclosure 2 of a cylindrical shape;
- a thermistor element 3 contained in the metal enclosure on the side of one end thereof;
- a pair of electrode wires 4 connected to the two opposing end surfaces of the thermistor element in a form being exposed over the thermistor element in the metal enclosure, and extending to the side of the other end of the metal enclosure to take out thermistor signals; and
- a sheath pin 6 contained in the metal enclosure on the other side thereof, the sheath pin 6 having core wires 6a electrically connected to the pair of electrode wires 4 and having a diameter larger than that of the thermistor element; wherein a portion of the metal enclosure, where the thermistor element is contained, is a small-diameter portion 2a;
- a distance H between the thermistor element in the small-diameter portion and the metal enclosure is not smaller than 0 but is not larger than 0.3 mm;
- a portion of the metal enclosure where the sheath pin is contained, is a large-diameter portion 2c having a diameter larger than that of the small-diameter portion; and a portion of the metal enclosure where the pair of electrode wires are contained, is an intermediate-diameter portion 2b having a diameter larger than that of the small-diameter portion but is smaller than that of the large-diameter portion.

According to this invention, the distance H between the thermistor element and the metal enclosure is not smaller than 0 but is not larger than 0.3 mm, making it possible to provide higher response characteristics as in the first aspect of the invention.

By draw-forming the cylindrical metal enclosure, further, the portion containing the thermistor element is formed to possess a small diameter, making it possible to favorably realize the distance between the thermistor element and the metal enclosure to be not smaller than 0 but not larger than 0.3 mm.

In draw-forming the portion of the metal enclosure where the thermistor element is contained, if this portion is draw-formed to possess a diameter as fine as the diameter of the electrode wire-containing portion between the sheath pin-containing portion and the thermistor element-containing portion, vibration of the metal cover easily transmits to the electrode wires often causing the electrode wires to be broken.

According to the present invention, therefore, the portion of the metal enclosure containing the electrode wires is draw-formed to be an intermediate-diameter portion to decrease the size and volume of the metal enclosure, so that the heat is favorably drawn and that the vibration of the metal enclosure is hardly transmitted to the electrode wires in the electrode wire-containing portion. It is, therefore, possible to improve the resistance of the electrode wires against the vibration.

According to the experiment and study conducted by the present inventors, when the outer diameter D1 of the sheath pin 6 is 1, it is desired that the inner diameter D3 of the intermediate-diameter portion 2b is not smaller than 0.5, the inner diameter D4 of the small-diameter portion 2a is not smaller than 0.25, the length L1 of the intermediate-diameter portion from the end of the sheath pin is not smaller than 3 mm, and the length L2 of the metal enclosure 2 extending from the end of the sheath pin to the side of the small-diameter portion is not larger than 16 mm as contemplated in a seventh aspect of the invention.

According to an eighth aspect of the present invention, an insulating member 5 is interposed among the thermistor element 3, the electrode wires 4 and the metal enclosure 2 to electrically insulate them from each other.

The metal enclosure may be brought into direct contact with the thermistor element. In this case, however, a leakage current may flow from the thermistor element into the metal enclosure to deteriorate the response characteristics. According to the present invention, on the other hand, the insulating member prevents the flow of leakage current, which is desirable from the standpoint of improving the response characteristics.

Here, according to a ninth aspect of the present invention, the thermistor element 3 and the metal enclosure 2 are in contact with each other via the insulating member 5, eliminating undesired gaps among the thermistor element, the insulating member and the metal enclosure, and making it possible to shorten the distance between the metal enclosure and the thermistor element as much as possible.

As the insulating member, there can be employed the electrically insulating layer 5 which is so formed as to cover the surfaces of the thermistor element 3 and of the electrode wires 4 (tenth aspect of the invention), or there can be employed the electrically insulating layer 5 formed on the inner surface of the metal enclosure 2 (eleventh aspect of the invention).

As the insulating member, further, there can be employed a crystallized glass or a ceramic as contemplated in a twelfth aspect of the invention.

Reference numerals attached to the above-mentioned means represent correspondence to concrete means described in the embodiments appearing below.

BRIEF DESCRIPTION OF THE DRAWINGS

FIG. 8 is a table illustrating the results of vibration testing of the electrode wires in the temperature sensor shown in FIG. 7;

FIG. 9 is a table illustrating the results of vibration testing of the electrode wires in the temperature sensor having a metal enclosure with an intermediate-diameter portion according to a preferred embodiment;

FIG. 10 is a table illustrating the results of vibration testing of the electrode wires in the temperature sensor having a metal enclosure with an intermediate-diameter portion according to an embodiment different from that of FIG. 9;

FIGS. 12A and 12B are sectional views schematically illustrating various modifications of a structure for connecting the thermistor element to the electrode wires;

FIG. 13 is a sectional view schematically illustrating the arrangement of the core wires of a sheath pin and the electrode wires;

DESCRIPTION OF THE PREFERRED EMBODIMENTS

Figure 1:
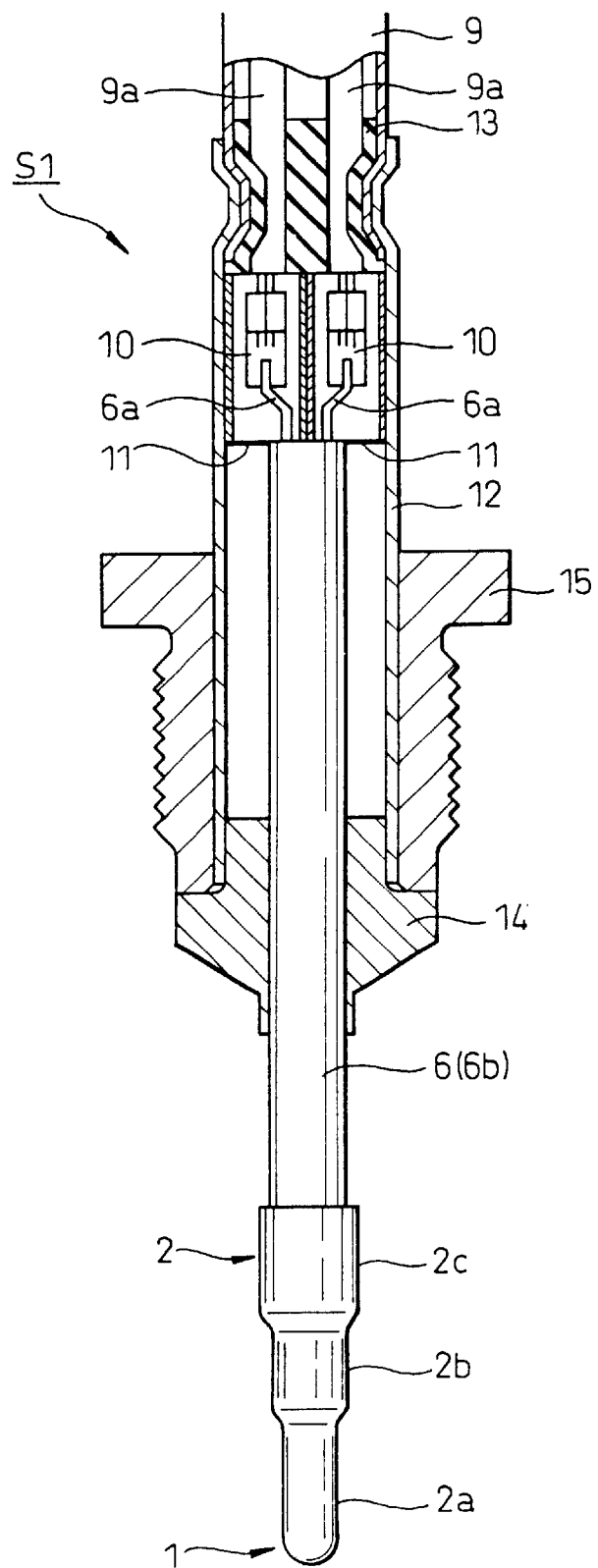
FIG. 1 is a view illustrating, partly in cross section, the whole constitution of a temperature sensor according to an embodiment of the present invention.
Figure 2:
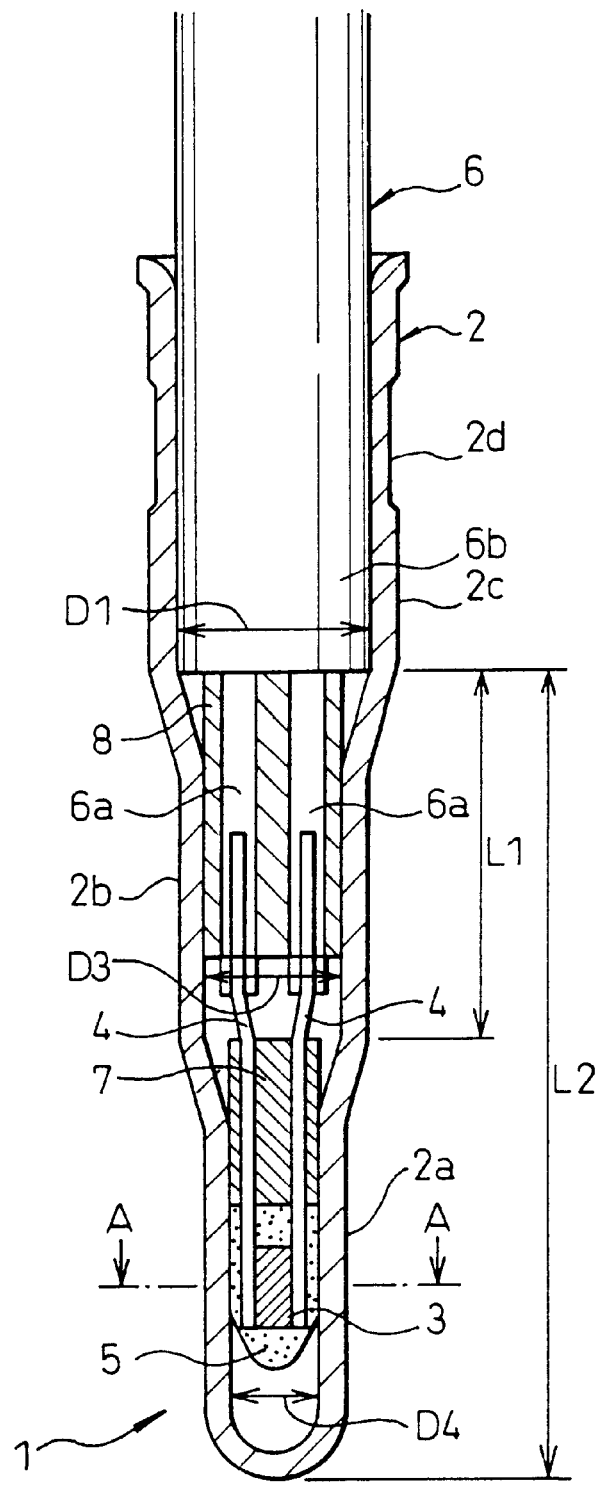
FIG. 2 is a sectional view illustrating a temperature-sensing portion in FIG. 1 on an enlarged scale.
Figure 3:
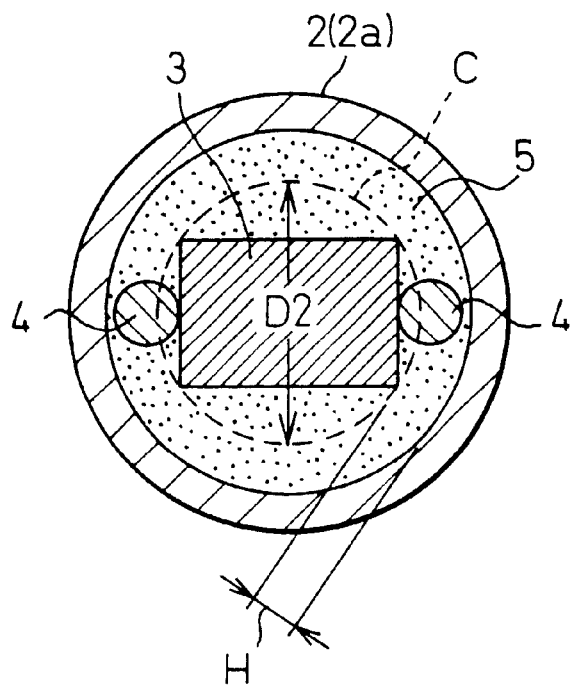
FIG. 3 is a sectional view along the line A—A in FIG. 2.

The invention will now be described by way of the embodiments shown in the drawings. FIG. 1 is a view illustrating the whole constitution of a temperature sensor S1 according to an embodiment of the present invention, and is a sectional view thereof except at temperature-sensing portion 1. FIG. 2 is a sectional view illustrating the temperature-sensing portion 1 in FIG. 1 on an enlarged scale, and FIG. 3 is a sectional view along the line A—A in FIG. 2. The sensor S1 is mounted, for example, in an exhaust gas system of an automobile and is used as an exhaust gas temperature sensor.

First, the temperature-sensing portion 1 will be described by making reference chiefly to FIGS. 2 and 3. Reference numeral 2 denotes a metal enclosure made of a metal having excellent heat resistance, such as a stainless steel. In this embodiment, the metal enclosure 2 is in the form of a staged cylinder having a bottom on one end thereof and an opening on the other end thereof. The metal enclosure 2 contains a thermistor element 3 in one end thereof (on the bottom side).

In this embodiment, the thermistor element 3 is capable of withstanding high temperatures (e.g., not lower than 1000° C.), and is formed by sintering and molding a semiconductor material (thermistor material) or the like material containing Cr—Mn as a chief component. In this embodiment, the thermistor element 3 is of a square pole-like shape.

In the metal enclosure 2, a pair of electrode wires 4 are connected to the thermistor element 3 to take out thermistor signals (output signals by utilizing resistance (R)—temperature (T) characteristics). The electrode wires 4 are connected to the two opposing end surfaces of the thermistor element 3 being exposed over the thermistor element 3.

The electrode wires 4 are separated away from each other in parallel, and are arranged to extend to the other end side (open side) of the metal enclosure 2 along the axis of the metal enclosure 2. Here, the thermistor element 3 and the electrode wires 4 are joined together by metallization by, for example, brazing or by using a platinum paste.

On one end side of the metal enclosure 2, an insulating member 5 is interposed among the thermistor element 3, the electrode wires 4 and the metal enclosure 2 to electrically insulate them from each other. The insulating member 5 may be a crystallized glass or a ceramic.

In this embodiment, the insulating member 5 is a glass layer (electrically insulating layer) 5 of alumina or silica formed so as to cover the surfaces of the thermistor element 3 and of the electrode wires 4.

Referring to FIGS. 2 and 3, the thermistor element 3 and the metal enclosure 2 are connected to each other via the glass layer (insulating member) 5. The glass layer 5 is formed by, for example, immersing the thermistor element 3 to which the electrode wires 4 are connected in a liquid glass. The thickness may be to maintain the electrically insulating property and is, for example, at least several microns or more.

On the other end side (open side) of the metal enclosure 2, there is inserted a sheath pin 6 which is a wiring member for taking out thermistor signals to the external unit through the electrode wires 4. The sheath pin 6 is obtained by containing a pair of core wires 6a made of a stainless steel or the like metal in an outer cylinder 6b made of a stainless steel or the like metal and being filled with an insulating powder such as magnesia or the like between the core wires 6a and the outer cylinder 6b.

In this embodiment, the sheath pin 6 has an outer diameter D1 (see FIG. 1) greater than that of the thermistor element 3. This is because, in order to improve the response characteristics of the sensor, it is desired to decrease the diameter of the metal enclosure 2 to improve the heat-drawing property accompanied by a decrease in the size of the thermistor element 3.

Concretely speaking as shown in FIG. 3, when a circumscribed circle C of the thermistor element 3 is imagined on a plane at right angles with the long axis of the sensor, the size of the thermistor element 3 is determined based on a comparison of the diameter D2 of the circumscribed circle C with the outer diameter D1 of the sheath pin 6. In this case, the outer diameter D1 of the sheath pin 6 is from 1.6 mm to 3.2 mm, and the diameter D2 of the circumscribed circle C of the thermistor element 3 is from 0.35 mm to 0.8 mm.

Concerning the thermistor element 3 having such a small size, it is desired that the ratio D1/D2 of the outer diameter D1 of the sheath pin 6 to the diameter D2 of the circumscribed circle C of the thermistor element 3 is from 2 to 10. More desirably, the ratio D1/D2 is from 3 to 5.

The other end side of the metal enclosure 2 is attached to the sheath pin 6 by caulking, and the caulked portion 2d is welded along the whole circumference thereof to firmly join them together. Therefore, the thermistor element 3 in the metal enclosure 2 is not exposed to the outer environment.

In the metal enclosure 2 on the side where the sheath pin 6 is inserted, the core wires 6a are protruded beyond the outer cylinder 6b and are joined to the pair of electrode wires 4 by resistance welding or laser welding, and are electrically connected thereto.

Here, as shown in FIG. 2, the pair of electric wires 4 are penetrating through a holder member 7 at portions protruding beyond the glass layer 5 up to where they are joined to the core wires 6a in the metal enclosure 2. The holder member 7 is the one formed of an insulator (e.g., alumina or the like), and has a pair of holes through which the pair of electrode wires 4 pass through. The electrode wires 4 are held by the holder member 7 and are electrically insulated from the metal enclosure 2.

Figure 4:
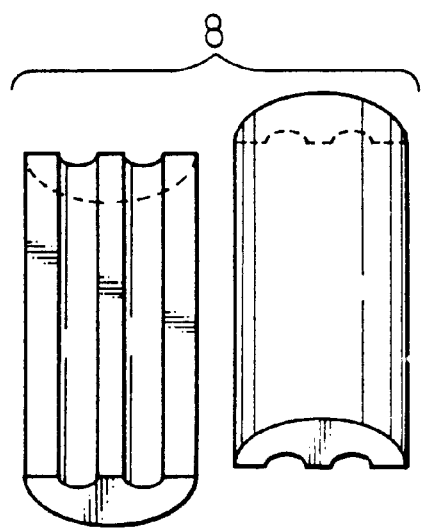
FIG. 4 is a view illustrating an insulator in FIG. 2 in a split manner.

In the metal enclosure 2, further, the core wires 6a protruding beyond the outer cylinder 6b of the sheath pin 6 and the junction portions between the core wires 6a and the electrode wires 4, are passing through the insulator 8 of alumina or the like so as to be held thereby, and are electrically insulated from the metal enclosure 2. The insulator 8 has been split into two as shown in FIG. 4, and can become a unitary structure by fitting them together.

In this embodiment, further, the temperature-sensing portion 1 has a particular constitution as described below. First, along the whole circumference of the thermistor element 3, the distance H (shortest distance, see FIG. 3) between the thermistor element 3 and the metal enclosure 2 is selected to be not smaller than 0 but not larger than 0.3 mm.

Further, the metal enclosure 2 is draw-formed in two stages from the other end side (open side) to the one end side (bottom side). That is, the portion of the metal enclosure 2 where the thermistor element 3 is contained is draw-formed into a small-diameter portion 2a having a diameter smaller than that of the portion on the other side of the metal enclosure 2.

Further, the sheath pin 6 having a diameter larger than that of the thermistor element 3 is contained in the metal enclosure 2 on the other end thereof. Here, the portion of the metal enclosure 2 between the portion (sheath pin-containing portion) 2c where the sheath pin 6 is contained and the small-diameter portion 2a, is an intermediate-diameter portion 2b having a diameter larger than that of the small-diameter portion 2a but smaller than that of the sheath pin-containing portion 2c.

In the embodiment shown in FIG. 2, in particular, the sheath pin-containing portion 2c of the metal enclosure 2 is formed to be the large-diameter portion 2c, the thermistor element-containing portion is formed to be the small-diameter portion 2a, and the portion (electrode wire-containing portion) containing the pair of electrode wires 4 between the above two portions 2a and 2c is formed to be the intermediate-diameter portion 2b having a diameter larger than that of the small-diameter portion 2a but is smaller than that of the large-diameter portion 2c.

According to a preferred embodiment of the metal enclosure 2, when the outer diameter D1 of the sheath pin 6 is denoted by 1, the inner diameter D3 of the intermediate-diameter portion 2b is not smaller than 0.5, the inner diameter D4 of the small-diameter portion 2a is not smaller than 0.25, the length L1 of the intermediate-diameter portion 2b from the end of the sheath pin 6 (i.e., from the end surface of the outer cylinder 6b) is not smaller than 3 mm, and the length L2 of the metal enclosure 2 extending to the small-diameter portion 2a from the end of the sheath pin 6 is not larger than 16 mm.

Referring to FIG. 1, further, an end of the sheath pin 6 on the side opposite to the portion where it is connected to the temperature-sensing portion 1, is electrically connected to a wiring member 9 for connection to an external unit. The wiring member 9 for connection to an external unit is electrically connected to an external circuit that is not shown. Through this wiring member 9 for connection to an external unit, the temperature sensor S1 and the external circuit are connected together so as to exchange signals.

The lead wires 9a of the wiring member 9 for connection to external unit and the core wires 6a of the sheath pin 6 are electrically connected together through connection terminals 10. For example, the core wires 6a of the sheath pin 6 and the connection terminals 10 are joined together by welding, and the lead wires 9a of the wiring member 9 for connection to external unit and the connection terminals are joined together by caulking.

Further, the junction portions between the lead wires 9a of the wiring member 9 for connection to an external unit and the core wires 6a of the sheath pin 6 are covered and protected by resin tubes 11 made of a heat-resistant resin. Further, a metal tube 12, such as of a stainless steel, covers and protects the junction portions of the wiring member 9 for connection to an external unit and of the sheath pin 6 inclusive of resin tubes 11 and the connection portions and, further, covers and protects the portion between the connection portion of the sheath pin 6 on the side of the temperature-sensing portion and the connection portion on the side of the wiring member for connection to an external unit.

On the side of the wiring member 9 for connection to an external unit, the metal tube 12 is secured by caulking to the wiring member 9 for external connection via a rubber bush 13 which is provided for the wiring member 9 for connection to an external unit. Further, a rib 14 is fitted to the sheath pin 6 and is secured thereto by caulking and welding to hold the sheath pin 6.

The metal tube 12 is fitted to the rib 14 and is secured thereto by caulking and welding. A threaded member (mounting member) 15 is fitted onto the metal tube 12. The threaded member 15 is allowed to freely move and can be easily coupled in a threaded manner onto the portion where the sensor S1 is to be mounted.

The temperature sensor S1 can be assembled in a manner, for example, as described below. Connection and mounting can be accomplished relying upon the above-mentioned caulking and welding depending upon each of the portions.

The sheath pin 6 and the wiring member 9 for connection to an external unit are connected together through the connection terminals 10. The metal tube 12, rib 14 and threaded member 15 are mounted on the outer periphery of the sheath pin 6. Further, the electrode wires 4 integral with the thermistor element 3, glass layer 5 and holder member 7 are connected to the sheath pin 6.

An insulator 8 is fitted onto the connection portions between the electrode wires 4 and the sheath pin 6, the thermistor element 3 is inserted in the metal enclosure 2 which is draw-formed into a staged shape, and the metal enclosure 2 and the sheath pin 6 are secured together. Thus, the temperature sensor S1 shown in FIG. 1 is thus fabricated.

The temperature sensor S1 is inserted in a mounting hole (not shown) formed in, for example, an exhaust pipe of an automobile, is positioned as the rib 14 comes in contact with the mounting hole, and is coupled to the mounting hole in a threaded manner via the threaded member 15 so as to be fitted to the exhaust pipe.

As the fluid to be measured (exhaust gas, etc.) comes into contact with the temperature-sensing portion 1 protruded into the exhaust pipe, a signal that varies depending upon the temperature of the fluid to be measured is sent from the thermistor element 3 to an external unit through the electrode wires 4, sheath pin 6 and wiring member 9 for connection to an external unit.

In order to further improve the response characteristics compared to the conventional temperature sensors according to this embodiment, the distance H between the thermistor element 3 and the metal enclosure 2 is maintained to be not smaller than 0 mm but not larger than 0.3 mm along the whole circumference of the thermistor element 3. The range of the distance H is based on the results of a study conducted by the present inventors as described below.

Concerning the response characteristics of the temperature sensor, the present inventors have regarded the time (response time) until a signal from the thermistor element 3 represents 630° C. as a reference for judgement under a condition where the temperature sensor is placed in a furnace of 1000° C. and is heated up to 1000° C. The response time, so far, is 6 seconds at the shortest.

Figure 5:
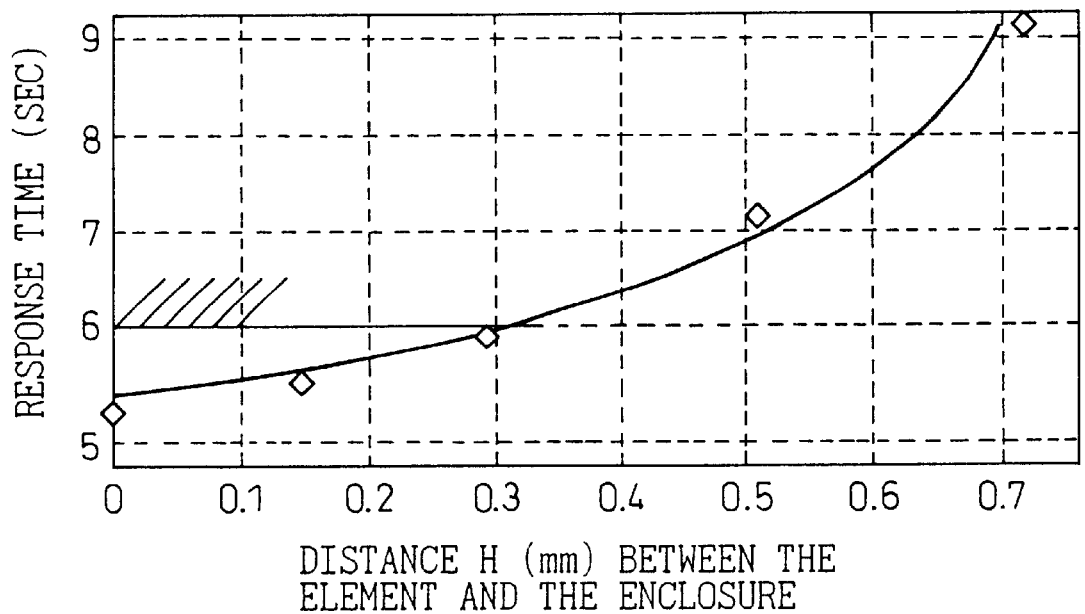
FIG. 5 is a diagram illustrating the results of examination of a relationship between the response time and the distance H from the element to the enclosure.

FIG. 5 is a diagram illustrating the results of examination of a relationship between the response time (in seconds) and the distance H (distance H between the element and the enclosure, in mm). The response time becomes short as the distance H decreases, and becomes shorter than 6 seconds as the distance H becomes smaller than 0.3 mm. In FIG. 5, the distance H which is close to 0 mm is a case where the glass layer 5 of a thickness of several microns is interposed between the thermistor element 3 and the metal enclosure 2.

From these results, therefore, if $0 \leq H \leq 0.3$ mm, then, there can be provided a temperature sensor Si exhibiting a response time shorter than 6 seconds which was the quickest response time, making it possible to provide a further improved response characteristics.

In this embodiment, further, the cylindrical metal enclosure 2 is draw-formed so that the thermistor element-containing portion of the metal enclosure 2 becomes a small-diameter portion 2a having a diameter smaller than that of other portions of the metal enclosure 2, thereby to favorably maintain the distance H between the element and the enclosure within the above-mentioned range.

According to this embodiment, further, the portion of the metal enclosure 2 between the small-diameter portion 2a and the sheath pin-containing portion 2c on the other end side thereof, is formed to be the intermediate-diameter portion 2b which is so draw-formed as to assume a diameter larger than that of the small-diameter portion 2 but is smaller than that of the sheath pin-containing portion 2c. This makes it possible to decrease the size and the volume of the metal enclosure 2 and to improve the heat-drawing property, which is desirable for improving the response characteristics.

Figure 6:
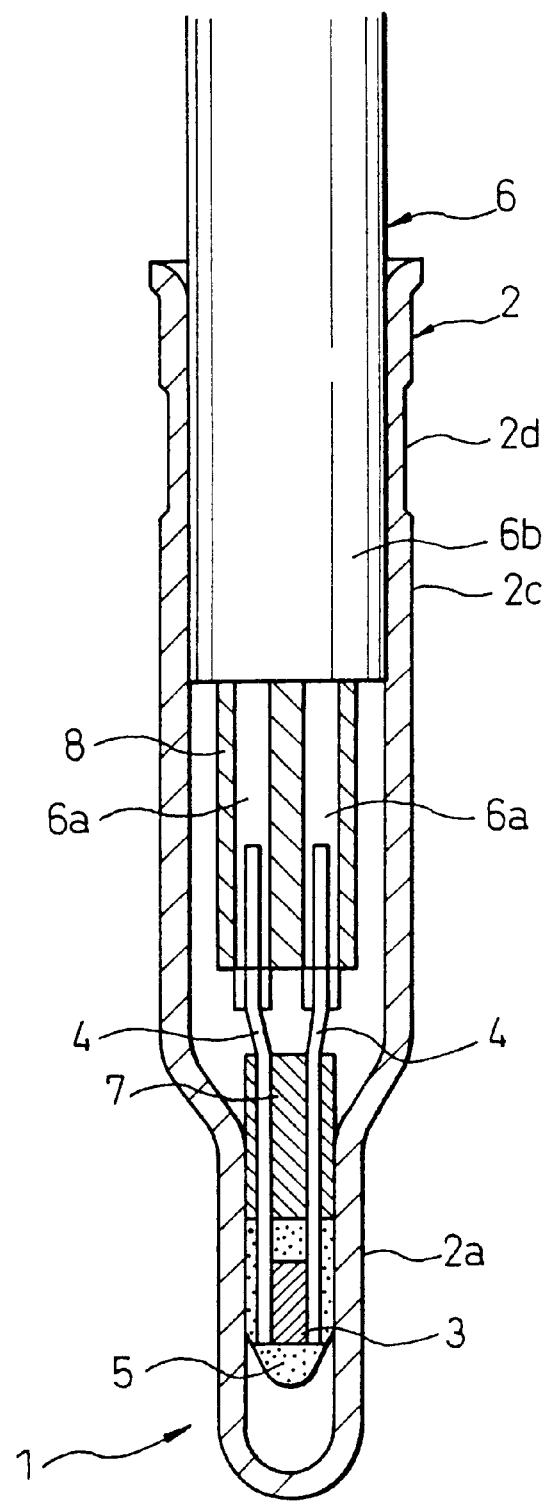
FIG. 6 is a sectional view schematically illustrating a metal enclosure which is draw-formed in one stage.

For example, the metal enclosure 2 according to this embodiment may not be draw-formed into a two-staged shape shown in FIG. 2 but may be draw-formed into a one-staged shape forming the small-diameter portion 2a only, as shown in FIG. 6, to exhibit the effect of favorably realizing the above-mentioned range of distance H. When draw-formed into two stages, however, it will be obvious that the size and volume of the portion of the metal enclosure 2 between the small-diameter portion 2a and the sheath pin-containing portion 2c can be decreased as compared to those of the draw-forming into one stage, and an excellent heat-drawing property is obtained.

Figure 7:
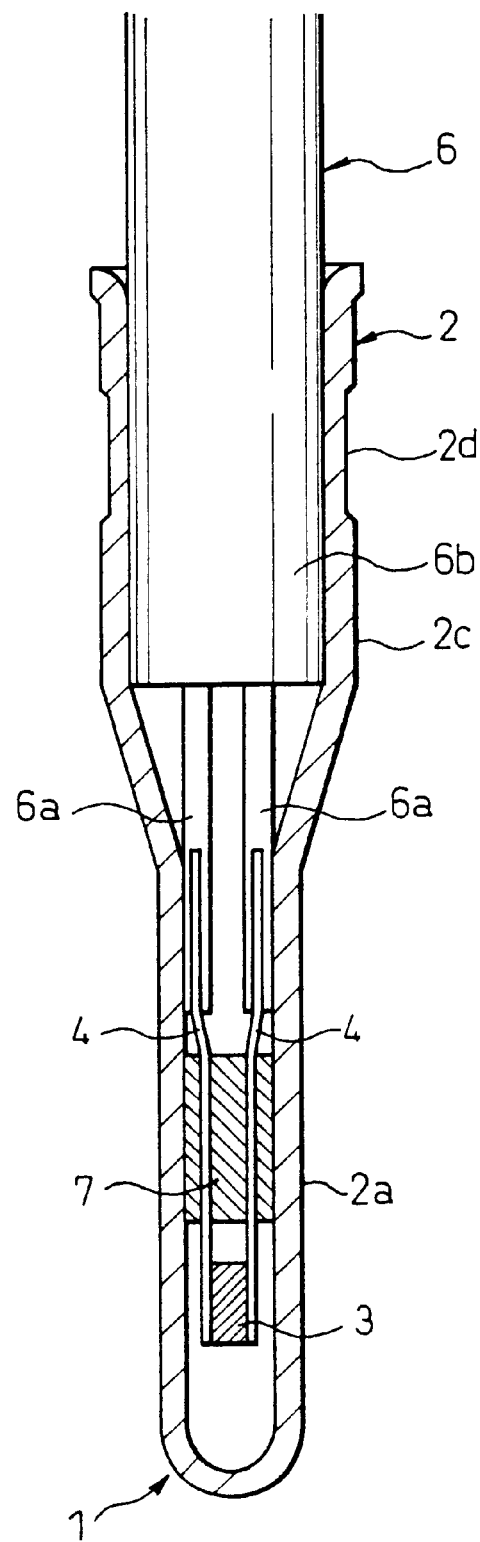
FIG. 7 is a sectional view schematically illustrating another metal enclosure which is draw-formed into one-staged shape.

In dealing with the metal enclosure draw-formed into one-staged shape according to this embodiment, it can be further contrived to form the small-diameter portion 2a in the metal enclosure 2 up to the electrode wire-containing portion as shown in FIG. 7. In this case, however, vibration of the metal enclosure 2 is easily transmitted to the electrode wires 4 causing the electrode wires 4 to be broken, depending upon the case.

Concerning the thermistor element shown in FIG. 7, the vibration testing was conducted for the electrode wires 4 by applying acceleration thereto at various frequency regions (frequency bands). FIG. 8 shows the results.

The temperature sensor must maintain its performance even in a vibrating environment shown in FIG. 8. In the temperature sensor shown in FIG. 7, the diameter of the electrode wire-containing portion of the metal enclosure 2 is brought close to the size of the thermistor element in order to improve the response characteristics. In an environment of a high frequency band and a large acceleration, however, the electrode wires 4 are broken.

FIGS. 9 and 10 show the results of the vibration testing effected for the temperature sensor equipped with the metal enclosure 2 having the intermediate-diameter portion 2b as shown in FIG. 2.

FIG. 9 shows the results of the above-mentioned preferred embodiment in which when the outer diameter D1 of the sheath pin 6 is 1, the inner diameter D3 of the intermediate-diameter portion 2b is not smaller than 0.5, the inner diameter D4 of the small-diameter portion 2a is not smaller than 0.25, the length L1 of the intermediate-diameter portion 2b from the end of the sheath pin 6 is not smaller than 3 mm, and the length L2 of the metal enclosure 2 from the end of the sheath pin 6 is not larger than 16 mm.

In FIG. 10, further, when the outer diameter D1 of the sheath pin 6 is 1, the inner diameter D3 of the intermediate-diameter portion 2b is smaller than 0.5, the inner diameter D4 of the small-diameter portion 2a is smaller than 0.25, the length L1 of the intermediate-diameter portion 2b from the end of the sheath pin 6 is smaller than 3 mm, and the length L2 of the metal enclosure 2 from the end of the sheath pin 6 is larger than 16 mm.

According to the results shown in FIGS. 9 and 10, with the metal enclosure 2 being provided with the intermediate-diameter portion 2b as sown in FIG. 2, the vibration resistance is improved as compared to that of when the metal enclosure 2 is not provided with the intermediate-diameter portion 2b. According to the results of FIG. 9, further, the vibration resistance is reliably satisfied at a practical level.

In this embodiment, further, the glass layer (insulating member) 5 is interposed among the thermistor element 3, the electrode wires 4 and the metal enclosure 2 to electrically insulate them from each other.

In this embodiment, the metal enclosure 2 may be in direct contact with the thermistor element 3. In this case, however, a leakage current may flow from the thermistor element 3 into the metal enclosure 2 to deteriorate the response characteristics. If the glass layer 5 is interposed as the insulating member, however, the leakage current is prevented from flowing, which is desirable from the standpoint of improving the response characteristics.

According to this embodiment, results the same as those of FIG. 5 are obtained even when there is no glass layer (insulating member) 5 among the thermistor element 3, the electrode wirings 4 and the metal enclosure 2. Namely, the response time of shorter than 6 seconds is accomplished irrespective of the presence of the glass layer 5 if the distance H is selected to be not smaller than 0 mm but not larger than 0.3 mm.

In this embodiment, further, the thermistor element 3 is in contact with the metal enclosure 2 via the glass layer (insulating member) 5 eliminating undesired gaps among the thermistor element 3, the glass layer 2 and the metal enclosure 2. It is, therefore, allowed to bring the metal enclosure as close to the thermistor element 3 as possible to set the distance H within the above-mentioned range, which is desirable. Without undesired gaps, further, the heat is favorably conducted from the outer side to the thermistor element 3.

(Other Embodiments)

Figure 11A:
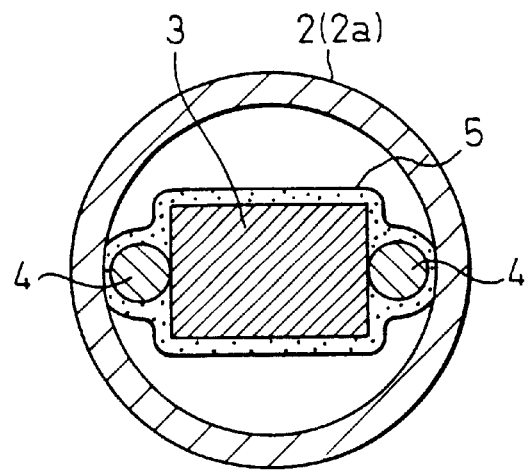
FIGS. 11A–11C are a sectional views schematically illustrating various modifications of the insulating member.

In addition to the shape shown in FIG. 3, the sectional shape of the glass layer 5 may be of the form of a layer tracing the surface shapes of the thermistor element 3 and of the electrode wires 4 as shown in FIG. 11A. As the insulating member 5 in the embodiment, further, there may be used the ones shown in FIGS. 11B and 11C in addition to using the glass layer 5.

Figure 11B:
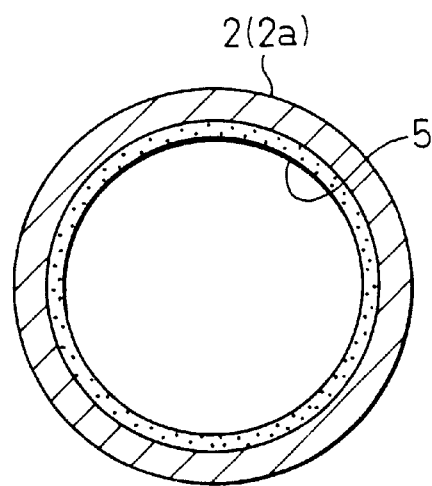

The insulating member shown in FIG. 11B is an electrically insulating layer (inner surface layer of the enclosure) 5 formed on the inner surface of the metal enclosure 2. The inner surface layer 5 of the enclosure can be formed by applying a liquid glass onto the inner surface of the metal enclosure 2, or by fitting the metal enclosure 2 onto the sheath in 6, followed by the heat-treatment in order to form a metal oxide film on the surface of the metal enclosure 2.

Figure 11C:
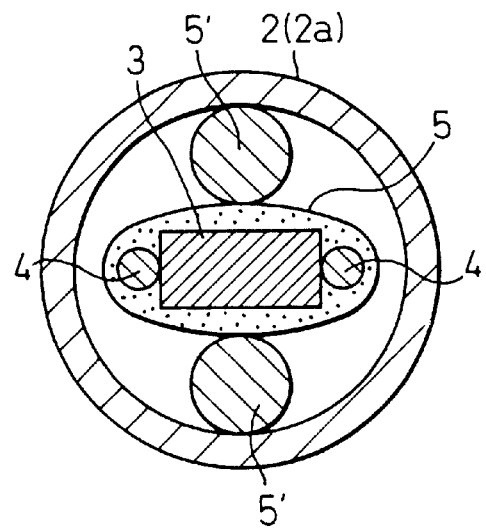

The insulating member 5 shown in FIG. 11C comprises a glass layer 5 for covering the surfaces of the thermistor element 3 and of the electrode wires 4, and fillers 5 of an insulator interposed between the thermistor element 3 and the metal enclosure 2. In this case, the thermistor element 3 is inserted in the metal enclosure 2 and, then, the fillers 5' are inserted in the gaps therebetween to accomplish the arrangement.

In the above-mentioned embodiment, the thermistor element 3 is held at its two opposing end surfaces by the pair of electrode wires 4, and has a size smaller than the gap between the pair of electrode wires 4. The thermistor element 3, however, may have a width of a portion held by the pair of electrode wires 4 smaller than the gap between the pair of electrode wires 4.

Referring, for example, to FIGS. 12A and 12B, recessed portions 3a may be formed in both end surfaces of the thermistor element 3 to which the pair of electrode wires 4 are to be connected, and the electrode wires 4 may be connected into the recessed portions 3a. In the thermistor element 3 in this case, the portion held by the pair of electrode wires 4 has a width smaller than the gap between the pair of electrode wires 4 but the other portions have a width greater than the gap between the pair of electrode wires 4.

As shown in FIG. 13, further, the gap between the pair of electrode wires 4 may be larger than the gap between the pair of core wires 6a of the sheath pin 6. Further, the thermistor element 3 may have a cylindrical shape or a disk-like shape, or may have any geometrical shape.

Figure 14A:
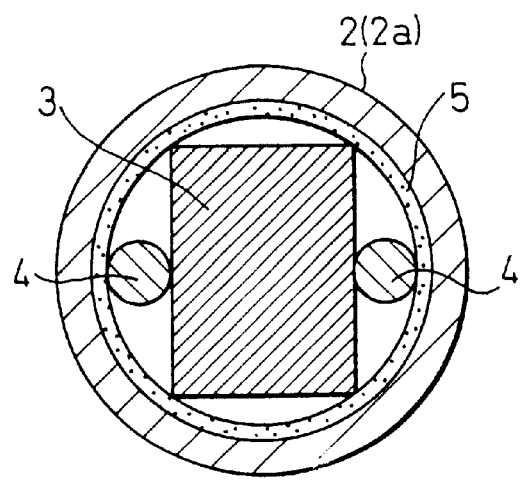
FIGS. 14A–14C are sectional views illustrating embodiments in which the metal enclosure and the thermistor element are in direct contact with each other.
Figure 14B:
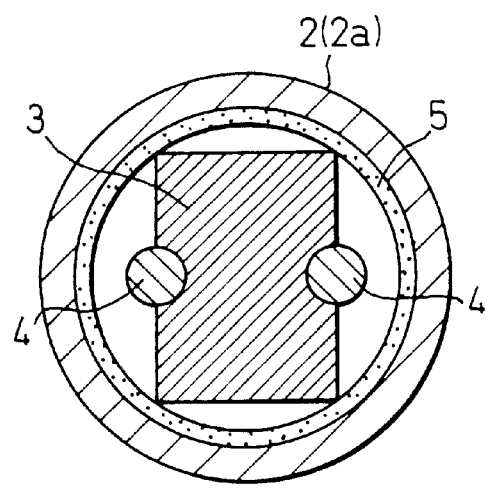
Figure 14C:
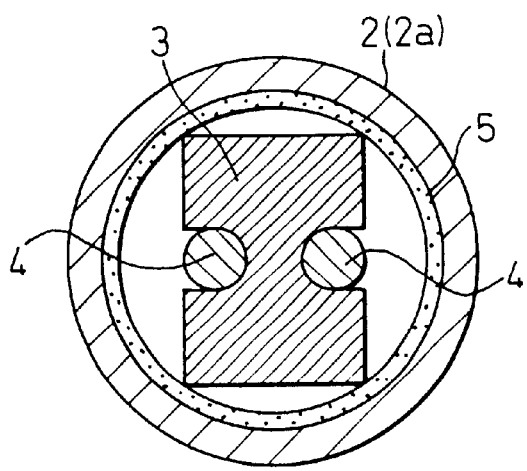

FIGS. 14A–14C are sectional views corresponding to the sectional view of FIG. 3, and illustrates an embodiment in which the metal enclosure 2 is in direct contact with the thermistor element 3. In the embodiment shown in FIGS. 14A–14C, the insulating member 5 is the inner surface layer 5 formed on the inner surface of the metal enclosure 2 as shown in FIG. 11B.

FIG. 14A illustrates a case possessing the thermistor element 3 and the electrode wires 4 shown in FIG. 3, and FIGS. 14B and 14C illustrate the cases corresponding to FIGS. 12A and 12B and where the metal enclosure 2 and the thermistor element 3 are in direct contact with each other. In FIG. 14, the metal enclosure 2 and the thermistor element 2 may be in direct contact with each other without having the layer 5 on the inner surface of the enclosure.

Figure 15:
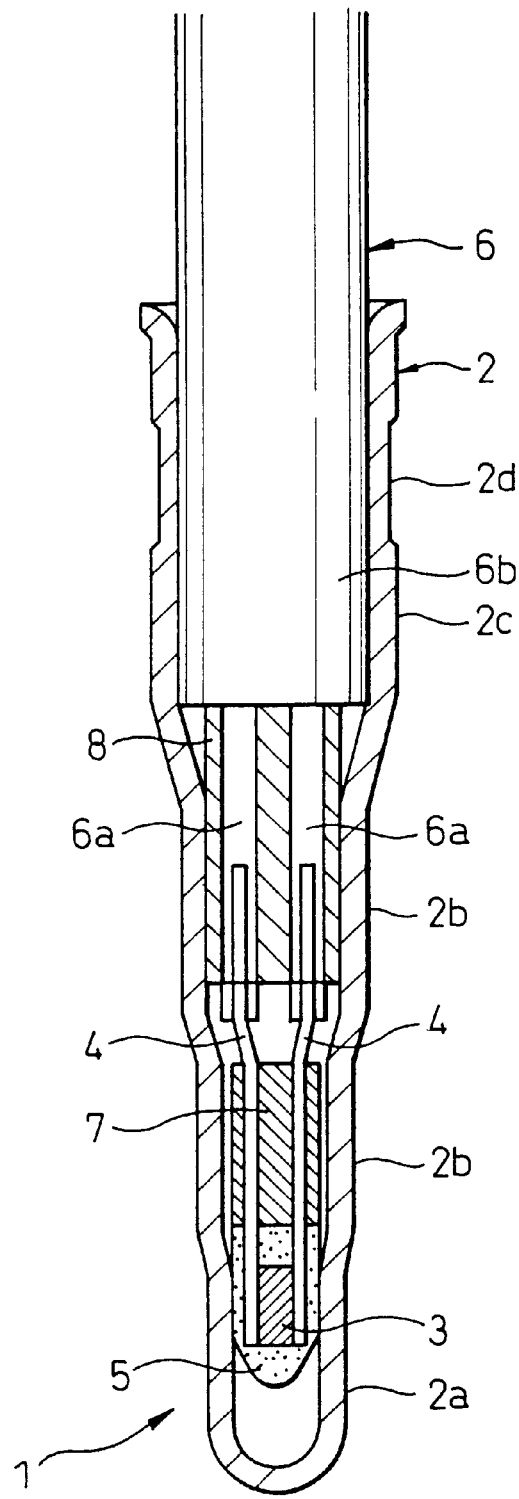
FIG. 15 is a sectional view illustrating another metal enclosure having an intermediate-diameter portion.

Moreover, the metal enclosure 2 having the intermediate-diameter portion 2b may be the one as shown in FIG. 15. In FIG. 15, the metal enclosure 2 is draw-formed in a number of stages larger than that of FIG. 3, and includes the intermediate-diameter portion 2b of two stages with different diameters.

What is claimed is:

1. A temperature sensor comprising:

a metal enclosure;

a thermistor element contained in said metal enclosure; and a pair of electrode wires connected to two opposing end surfaces of said thermistor element in a form being exposed over said thermistor element in said metal enclosure to take out thermistor signals; wherein a distance between said thermistor element and said metal enclosure is not smaller than 0 but is not larger than 0.3 mm;

said metal enclosure being of a cylindrical shape, said thermistor element is contained in said metal enclosure on the side of one end thereof, and a protion of said metal enclosure where said thermistor element is contained, is a small-diameter portion which is so draw-formed as to possess a diameter smaller than that of other portions of said metal enclosure; and a sheath pin in contained in said metal enclosure on the other side thereof, said sheath pin having core wires electrically connected to said pair of electrode wires and having a diameter larger than that of said thermistor element, and a portion of said metal enclosure between the portion containing said sheath pin and said small diameter portion is so draw-formed as to possess a diameter larger than that of said small-diameter portion but smaller than that of the portion containing the sheath pin, the outer diameter of the sheath pin being from 1.6 mm to 3.2 mm, and the diameter of the circumscribed circle of the thermistor element is from 0.35 mm to 0.8 mm.

2. A temperature sensor according to claim 1, wherein a ratio of the outer diameter of the sheath pin to the diameter of a circumscribed circle of the thermistor element is from 2 to 10.

3. A temperature sensor according to claim 1, wherein an insulating member is interposed among said thermistor element, said electrode wires (4) and said metal enclosure to electrically insulate them from each other.

4. A temperature sensor according to claim 3, wherein said insulating member is an electrically insulating layer so formed as to cover the surfaces of said thermistor element and of said electrode wires.

5. A temperature sensor according to claim 4, wherein said thermistor element and said metal enclosure are in contact with each other via said insulating member.

6. A temperature sensor according to claim 4, wherein said insulating member is an electrically insulating layer formed on the inner surface of said metal enclosure.

7. A temperature sensor according to claim 4, wherein said insulating member is a crystallized glass or ceramic.

8. A temperature sensor comprising:

a metal enclosure of a cylindrical shape;

a thermistor element contained in said metal enclosure on the side of one end thereof;

a pair of electrode wires connected to two opposing end surfaces of said thermistor element in a form being exposed over said thermistor element in said metal enclosure, and extending to the side of the other end of said metal enclosure to take out thermistor signals; and a sheath pin contained in said metal enclosure on the other side thereof, said sheath pin having core wires electrically connected to said pair of electrode wires and having a diameter larger than that of said thermistor element;

wherein a portion of said metal enclosure where said thermistor element is contained is a small-diameter portion;

a distance between said thermistor element in said small-diameter portion and said metal enclosure is not smaller than 0 but is not larger than 0.3 mm;

a portion of said metal enclosure where said pair of electrode wires are contained, is an intermediate-diameter portion having a diameter larger than that of said small-diameter portion but smaller than that of said large-diameter portion; and when the outer diameter of said sheath pin is D1, the inner diameter & of said intermediate-diameter portion is not smaller than 0.5D1, the inner diameter of said small-diameter portion is not smaller than 0.25D1, the length of said intermediate-diameter portion from the end of said sheath pin is not smaller than 3 mm, and the length of said metal enclosure extending from the end of said sheath pin to the side of said small-diameter portion is not larger than 16 mm.

9. A temperature sensor according to claim 8, wherein an insulating member is interposed among said thermistor element, said electrode wires (4) and said metal enclosure to electrically insulate them from each other.

10. A temperature sensor according to claim 9, wherein said thermistor element and said metal enclosure are in contact with each other via said insulating member.

11. A temperature sensor according to claim 9, wherein said insulating member is an electrically insulating layer so formed as to cover the surfaces of said thermistor element and of said electrode wires (4).

12. A temperature sensor according to claim 9, wherein said insulating member is an electrically insulating layer formed on the inner surface of said metal enclosure.

13. A temperature sensor according to claim 9, wherein said insulating member is a crystallized glass or ceramic.

* * * * *